March 26, 1968  G. CLOSE  3,375,018
PARALLELOGRAM CART

Filed June 15, 1966  8 Sheets-Sheet 1

INVENTOR
GARTH CLOSE
BY
Woodhams, Blanchard and Flynn
ATTORNEYS

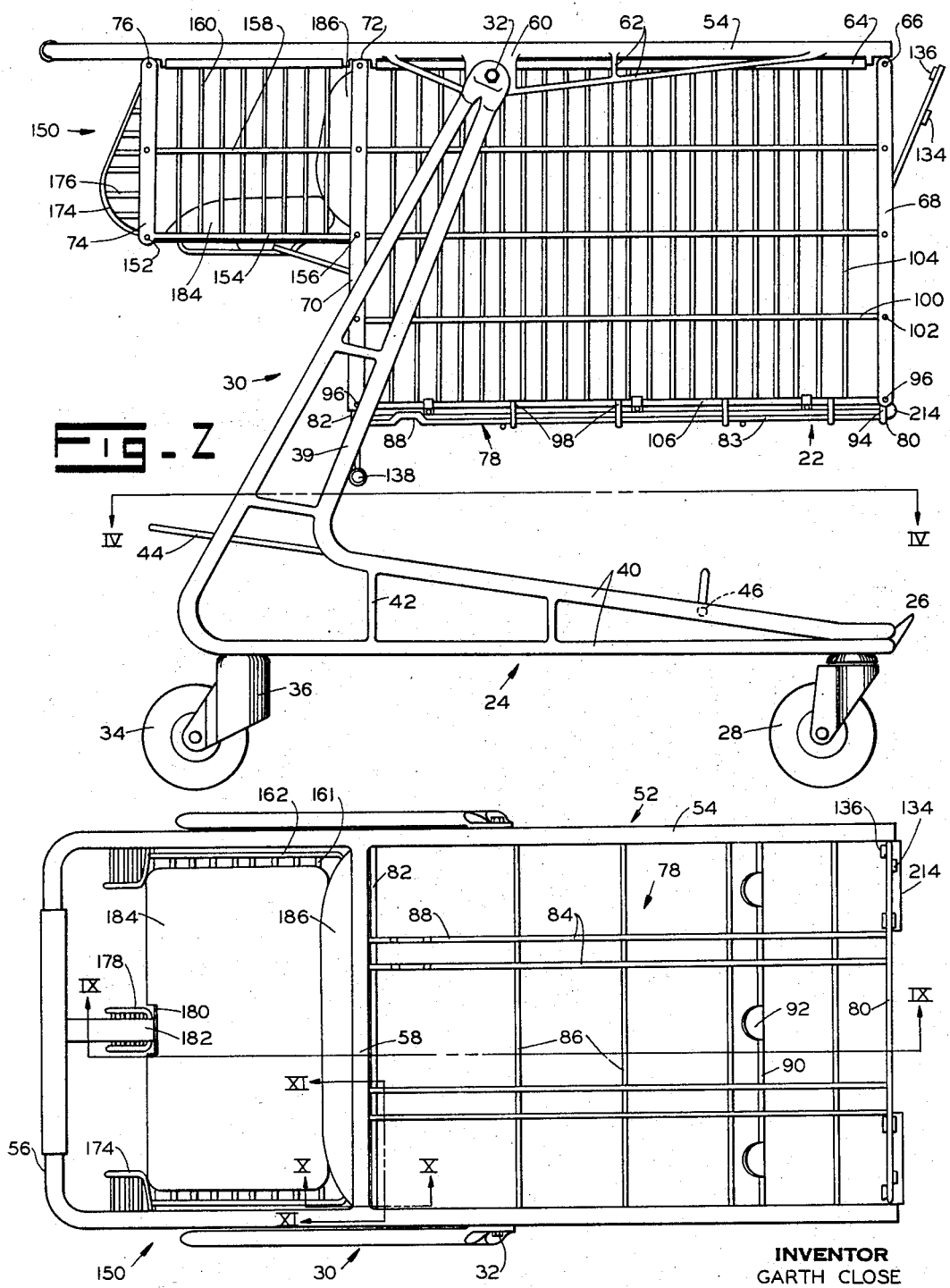

March 26, 1968  G. CLOSE  3,375,018
PARALLELOGRAM CART
Filed June 15, 1966  8 Sheets-Sheet 3
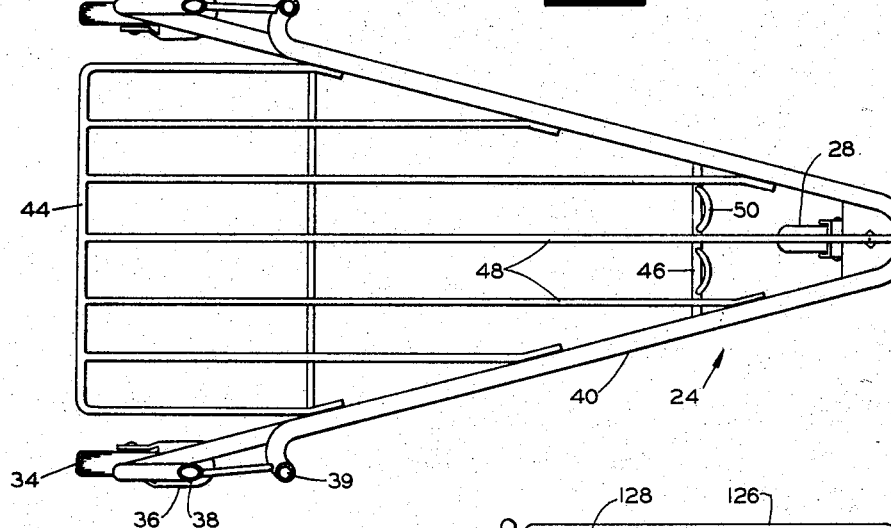
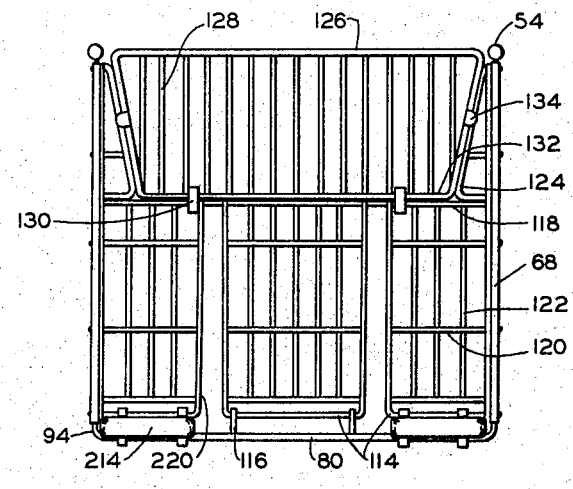
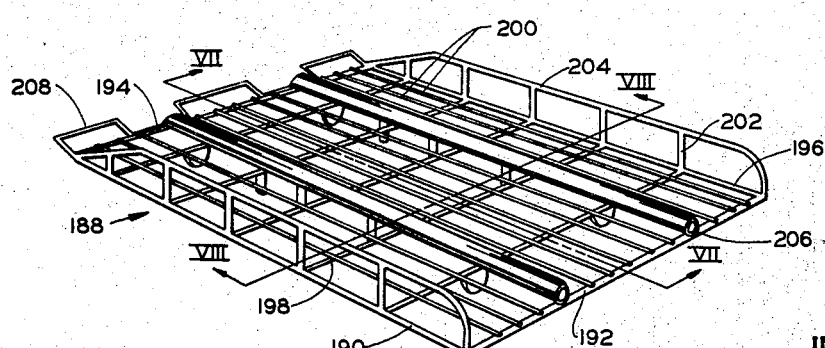
INVENTOR
GARTH CLOSE
BY
Woodhams, Blanchard and Flynn
ATTORNEYS March 26, 1968  G. CLOSE  3,375,018
PARALLELOGRAM CART
Filed June 15, 1966  8 Sheets-Sheet 4
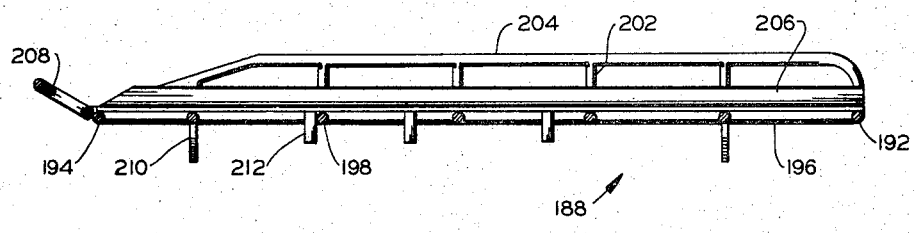
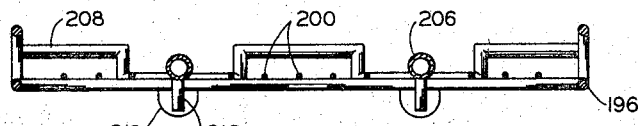
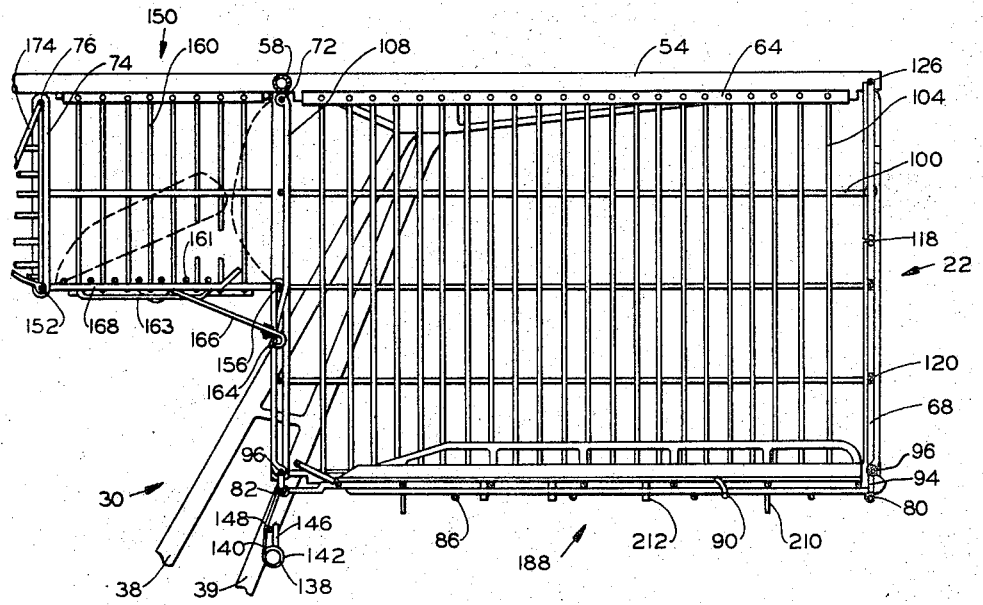
INVENTOR
GARTH CLOSE
BY
Woodhams, Blanchard and Flynn
ATTORNEYS

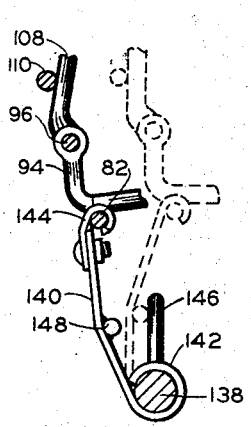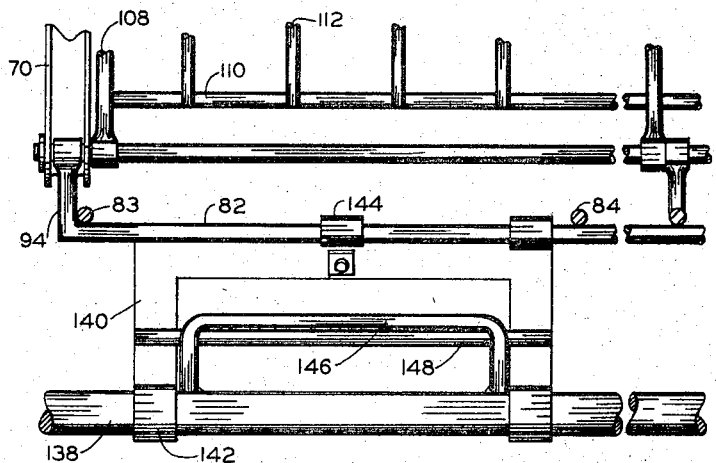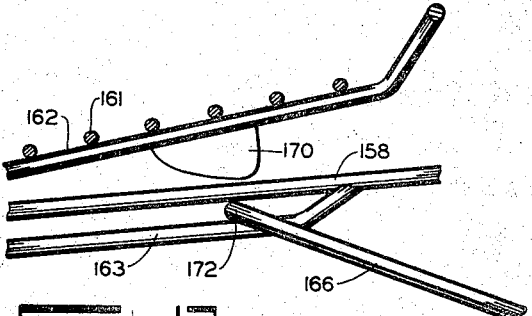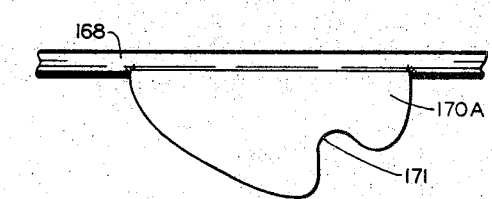

March 26, 1968   G. CLOSE   3,375,018
PARALLELOGRAM CART
Filed June 15, 1966   8 Sheets-Sheet 6

INVENTOR
GARTH CLOSE
BY
Woodhams, Blanchard and Flynn
ATTORNEYS

March 26, 1968  G. CLOSE  3,375,018
PARALLELOGRAM CART
Filed June 15, 1966  8 Sheets-Sheet 7

INVENTOR
GARTH CLOSE
BY
Woodhams, Blanchard and Flynn
ATTORNEYS

United States Patent Office 3,375,018
Patented Mar. 26, 1968

3,375,018
PARALLELOGRAM CART
Garth Close, Lubbock, Tex., assignor to United Steel and Wire Company, Battle Creek, Mich., a corporation of Michigan
Filed June 15, 1966, Ser. No. 557,809
28 Claims. (Cl. 280—33.99)

This invention relates to improvements in shopping carts with nestable carriage base and collapsible container basket. The principal objects of this invention are:

First, to provide a shopping cart with a wheeled carriage that is forwardly tapered to nest within the carriage base of a preceding cart and having upright supports on the sides of the carriage which tiltably support a collapsible, basket-like container which will tilt upwardly and collapsible in parallelogram fashion to occupy a minimum of space between carts during storage.

Further objects of the invention include the provsiion of a removable inner bottom for the basket or container which can be used alternatively to remove all of the contents of the basket at one time, or to be engaged with the back side of the carriage and the collapsed basket for use in supporting cases of goods, so that the cart may be used by store employees for moving bulk cases and for restocking shelves.

It is a feature of the construction of the collapsible container and its supporting carriage to provide one or more interlocks between the erected container or basket and the carriage frame which resist unintentional collapse of the container basket.

The container basket is provided with a main forward portion and a shallower rear portion with the rear portion being adapted for alternative use as a child's seat to support a child while the parent is shopping. The interlocks prevent injury to children by unintentional collapse of the basket containers.

An additional feature of the cart and basket is that the container basket in collapsed position presents smooth straight edges along an upward incline which are engageable with bumpers on the lower front edge of a following container so that the erected basket will automatically collapse to inclined position when pushed against a preceding cart with collapsed container or basket.

Additional refinements and details of the cart will be apparent from the consideration of the following description and claims. The drawings, of which there are eight sheets, illustrate a highly practical form of the cart and its carriage and collapsible basket.

FIGURE 2 is a side elevational view of the cart as shown in FIGURE 1 with a portion of the front wall of the container basket swung partially open to facilitate unloading of the cart.

FIGURE 3 is a top plan view of the cart as shown in FIGURE 1.

FIGURE 4 is a horizontal cross sectional view taken along the plane of the line IV—IV in FIGURE 2 and showing the lower portion of the carriage of the cart.

FIGURE 5 is a front elevational view of the front or main container basket of the cart without the removable inner bottom in place therein.

FIGURE 6 is a front corner perspective view of the removable inner bottom adapted to be used in the basket shown in the other figures of the drawings.

FIGURE 7 is a longitudinal vertical cross sectional view through the removable inner bottom taken along the plane of the line VII—VII of FIGURE 6.

FIGURE 8 is a transverse vertical cross sectional view taken along the plane of the line VIII—VIII of FIGURE 6.

FIGURE 9 is a fragmentary, vertical longitudinal cross sectional view through the two container basket portions of the cart, the view being taken along the plane of the line IX—IX in FIGURE 3.

FIGURE 10 is a fragmentary enlarged vertical cross sectional view taken along the plane of the line X—X in FIGURE 3 and illustrating one of the locking connections between the rear edge of the main container basket and the carriage frame.

FIGURE 11 is a fragmentary vertical cross sectional view taken along the plane of the line XI—XI in FIGURE 3 and showing the structure in FIGURE 10 in front elevation.

FIGURE 12 is a fragmentary vertical longitudinal cross sectional view through the bottom of the rear container basket and illustrating the second lock means between the collapsible basket and the carriage of the cart.

FIGURE 13 is a fragmentary view similar to FIGURE 12 showing the parts of the second lock in unlocked position.

FIGURE 14 is a fragmentary side elevational view of a modified form of lock usable alternatively to the lock shown in FIGURES 12 and 13.

Figure 1:
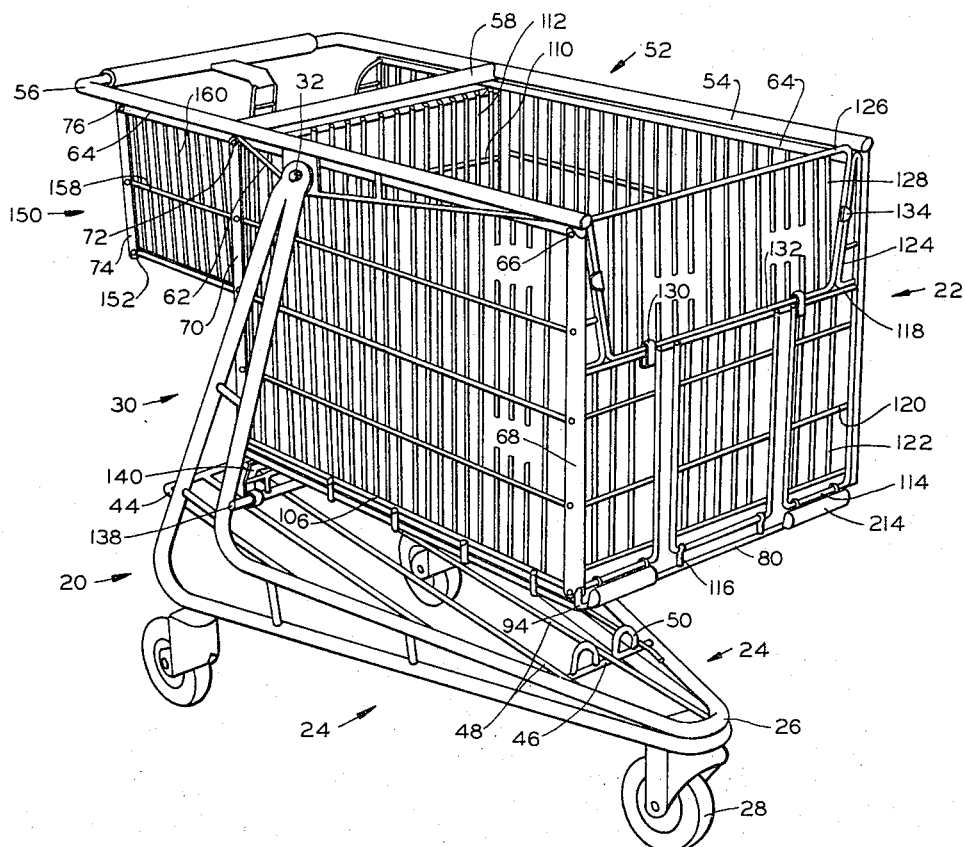
FIGURE 1 is a front corner perspective view of the cart with the container basket in erected operative position.

The cart of the invention comprises a wheeled carriage frame generally indicated at 20 which supports a container or basket member generally indicated at 22. The carriage frame 20 includes lower side members generally indicated at 24 which converge forwardly and are connected by integral U-bends as at 26. A caster mounted wheel 28 is connected to the underside of the U-bend portion of the carriage base. At its rear end the carriage 20 is provided with laterally spaced uprights generally indicated at 30. As appears most clearly in FIGURE 2 the uprights 30 are inclined forwardly and are provided with pivot support pins 32 at the top which are located forwardly of the rear end of the carriage. Two rear wheels 34 are secured to the rear ends of the carriage base 24 by means of brackets 36 which may be fixed or castered as desired. More specifically the carriage frame and the lower base and upright thereof are formed of two tubular members 38 and 39 which are joined together at the pivot 32 and diverge downwardly to the rear end of the base, from where they converge forwardly as at 40 to the U-bend portions 26 at the forward end of the carriage. The spaced tubes 38 and 39 of the side members of the carriage are interconnected and braced by appropriate cross struts 42. Desirably a bottom shelf is supported in an incline along the upper tube 39, the shelf consisting of the outer U-shaped rod 44 secured to the side frame members and a cross rod 46 connected between the converging forward ends of the side frame members. Other longitudinal rods 48 complete the shelf which projects rearwardly and upwardly from the back of the carriage. The front cross rod 46 is provided with upstanding inverted U-shaped lugs 50 which act as stops for holding merchandise on the inclined lower shelf.

Turning now to the construction of the container 22 it will be noted that the container is provided with a U-shaped upper container rim forming a rigid polygonal basket top frame element generally indicated at 52. The top frame is formed of tubular stock and has spaced, parallel side elements 54 connected at the rear by a cross bar 56 which also functions as a handle for the carriage. An intermediate cross tube or member 52 is connected between the side members 54 rearwardly of the pivotal connection 32 to the basket or container assembly 22. The pivot 32 is connected through a depending plate 60 secured to the bottom of the side members 54, and where necessary the side members may be strengthened by truss rods such as those indicated at 62 in FIGURES 1 and 2. Spaced laterally inwardly from the pivot supporting plates 60, the side members 54 of the container frame carry depending longitudinal flanges 64 to which the collapsible elements of the container are attached as will be described.

Pivoted to the front ends of the flanges 64 as at 66 are front corner bars 68 of channel shaped cross section. Rear corner bars 70 also of channel shaped cross section are pivotally suspended from the flanges 64 by the pivots 72. Rearwardly from the main, rear corner bars 70 are short, auxiliary corner bars or members 74 pivoted to the top frame member by pivots 76. A polygonal or rectangular basket bottom member indicated generally at 78 is supported between the lower ends of the corner bars 68 and 70 by means of a front cross bar 80 and a rear cross bar 82.

Longitudinal edge rods 83 connect the front cross rod 80 and the rear cross rod 82 with intermediate rods 84 and transverse bars or rods 86 connected in crossing relation to the longitudinal rods. The longitudinal rods 83 and 84 are provided toward their rear ends with vertically upwardly offset portions 88 for a purpose which will be described presently. One of the forwardly displaced transverse rods or bars 90 is provided with upwardly and rearwardly inclined catches in the form of semicircular discs 92, the purpose of which will also be described presently. With particular attention to FIGURES 1, 2, 5, 9, 10 and 11 it will be noted that the front cross rod 80 and the rear cross rod 82 are provided with upturned ends as at 94 so that the particular cross rods hang below their pivotal connections 96 to the respective corner members 68 and 70. The transverse rods 86 and 90 are provided with corresponding upturned ends 98.

The forward or main container basket 22 is completed by side walls formed of longitudinally extending wires or rods 100 pivoted to the corner bars at 102, and longitudinally spaced vertical rods or wires 104 which are pivoted to a lower longitudinal channel 106 at their lower ends and to the depending flange 64 along the container frame member at the top. The longitudinal channels 106 are connected as by welding to the lowermost ones of the longitudinal rods 100 and extend therealong. The rear wall of the basket 22 is formed by side upright bars 108 (see FIGURE 9) which are pivoted on the cross rod pivots 72 and 96. Transverse rods or wires 110 and crossing vertical wires 112 form an open grid rear wall for the main basket.

The front wall of the main container basket 22 comprises a sectional lower cross bar 114 pivotally connected to the lower cross rod 80 by short uprights 116. A fixed cross bar 118 extends between the depending swingable corner bars 68 intermediate of their length and suitable intermediate cross bars 120 are provided. Transversely spaced upright rods or wires 122 connect the several cross rods. Positioned above the cross rod 118, adjacent each end thereof is a downwardly and transversely inwardly inclined fixed triangular wall section defined by an inclined rod 124 on each side connected by suitable lateral wires to the corner bars 68. This leaves a trapezoidal opening at the upper end of the front wall of the container or basket and this opening is closed by a swinging gate having a correspondingly shaped trapezoidal border wire or rod 126 with transversely spaced upright wires 128 extending between the top and bottom thereof. Elongated links 130 loosely pivotally connect the lower cross member 132 of the gate to the upper fixed cross bar 118 of the lower part of the front wall so that the trapezoidal gate can be moved upwardly or downwardly within the opening in the fixedly portions of the front wall. Forward stops 134 secured to the outer or front side of the gate are engageable with the front sides of the inclined rods or wires 124 while inner or rear stops or projections 136 (see FIGURE 2) are attached to the inner side of the gate. It is thus possible to lift upwardly on the front cross member 126 of the gate and release the trapezoidal shape or frame of the gate from engagement with the fixed portions of the front wall and swing the gate forwardly to the open position indicated in FIGURE 2. The gate can be raised to a vertical position and lowered with the stops 134 and 136 on opposite sides of the inclined rods 124 to lock the gate in closed position. Opening of the gate facilitates unloading of the basket by customers in a self-service market.

Attention is now directed to FIGURES 9, 10 and 11 which illustrate in greater detail the means for locking the front or main container basket 22 in rectangular erected position. Secured to the front tube 39 of the upright 30 at a point below the bottom of the basket 22 is a fixed cross bar 138 which serves incidentally to cross brace the two uprights 30. Swingably mounted on the cross bar 138 are a pair of U-shaped brackets 140 having their lower ends wrapped pivotally around the cross bar as at 142. The upper ends of the brackets 140 are pivotally connected to the rear cross bar 82 by wrap around clips 144. The cross bar 138 carries fixed inverted U-shaped rods 146 which functions as stops cooperative with short transverse projections in the form of rods or wires 148 on the brackets 140 so that as the collapsible parallelogram formed by the main basket 22 is swung downwardly and forwardly to erected position the brackets 140 swing from the full line position shown in FIGURE 10 to the dotted line position with the stops or projections 146 and 148 limiting further downward swinging motion of the bottom of the main container frame. With particular reference to FIGURE 9 it will be noted that the line through the pivots 72, 96 and the lower rear cross bar 82 is located forwardly of a line between the upper pivot 72 and the axis of cross bar 138 so that the basket container is in overcentering, locking relation to the fixed stops 146 and 148. Weight applied in or to the main basket, or forward inertia of the container cannot collapse the continer forwardly. Neither can downward pressure on the handle cross bar 56 collapse the container.

Attention is now invited to the rear or auxiliary container or basket indicated generally by the reference numeral 150. The rear or auxiliary short corner members 74 are pivotally connected by a cross bar 152 to lower longitudinal edge bars 154 which extend forwardly to pivotal connections to an intermediate cross bar 156 extending between the main rear hanger bars 70. Intermediate longitudinal bars or wires 158 are provided near the transverse center of the auxiliary basket, and longitudinally spaced short upright wires 160 pivotally connect the lower edge bars 154 to the rib or flange 64 on the bottom of the basket frame member to form collapsible parallelogram side walls for the auxiliary basket. The bottom of the rear basket 150 is disclosed most clearly in FIGURES 2, 3, 9 and 12 where it will be seen that intermediate longitudinal bars 158 have their ends pivoted on the rear pivot 152 and the intermediate pivot 156 so that the rear basket can swing and collapse in parallelogram fashion with the front main basket container 22. A folding bottom form of cross wires or rods 161 secured to a border frame 162 complete the bottom of the auxiliary basket. The border frame is pivoted at its rear edge to the cross bar 152. Intermediate rods 158 carry slot forming wires or rods 163 on their lower sides. Swingably connected to the main rear hanger bars 70 as at 164 in FIGURE 9 is a locking strut 166 which is of U-shaped configuration with the bight or cross piece of the U supported and guided in the slot between the rods 158 and 163. As appears in FIGURES 12 and 13 the swingable bottom 161, 162 of the auxiliary basket carries a depending locking plate or projection 170 which swings into place behind the bight or cross piece 172 of the strut 166 when the baskets are swung to erected rectangular position and the bottom frame 162 is swung downwardly. The interlock between the stop 170, the strut 166 and the pivot 164 serves as a second interlock between the two basket sections of the container thus locking the container in rectangular erected position independently of the interlock formed by the previously described stops 146, 148. FIGURE 14 shows a modified form of the secondary lock where the modified stop projection 170A is provided with a notch 171 for engagement with the bight of the interlocking strut.

In the particular example of the cart illustrated the rear wall of the auxiliary basket 150 is divided into three sections by means of rearwardly bowed upright side rods 174 pivoted between the pivots 152 and 76 with longitudinal rods or wires 176 connecting the end wall rods to the rear auxiliary hangers 74. An intermediate U-shaped rod having sides 178 similarly bowed rearwardly has its top cross piece or bight 180 pivotally connected to a fixed strut or bar 182 projecting forwardly from the rear cross piece or handle of the carriage frame. The spacing between the side rods 174 and the center rods 178 leaves two openings through which the legs of a small child seated in the auxiliary basket can extend rearwardly from the auxiliary basket.

Desirably a padded seat cushion 184 is pivoted along its rear edge to the cross bar pivot 152 above the bottom frame 162 of the auxiliary basket. The rearwardly curved contour of the sectional back wall 174, 178 provides storage space for this cushion when it is not needed for seating a child in the cart. The upright wires or rods 112 of the rear wall of the main container or basket are common to the front wall of the auxiliary basket and a padded back cushion 186 is secured to the rear sides of these rods within the auxiliary basket.

Figure 15:
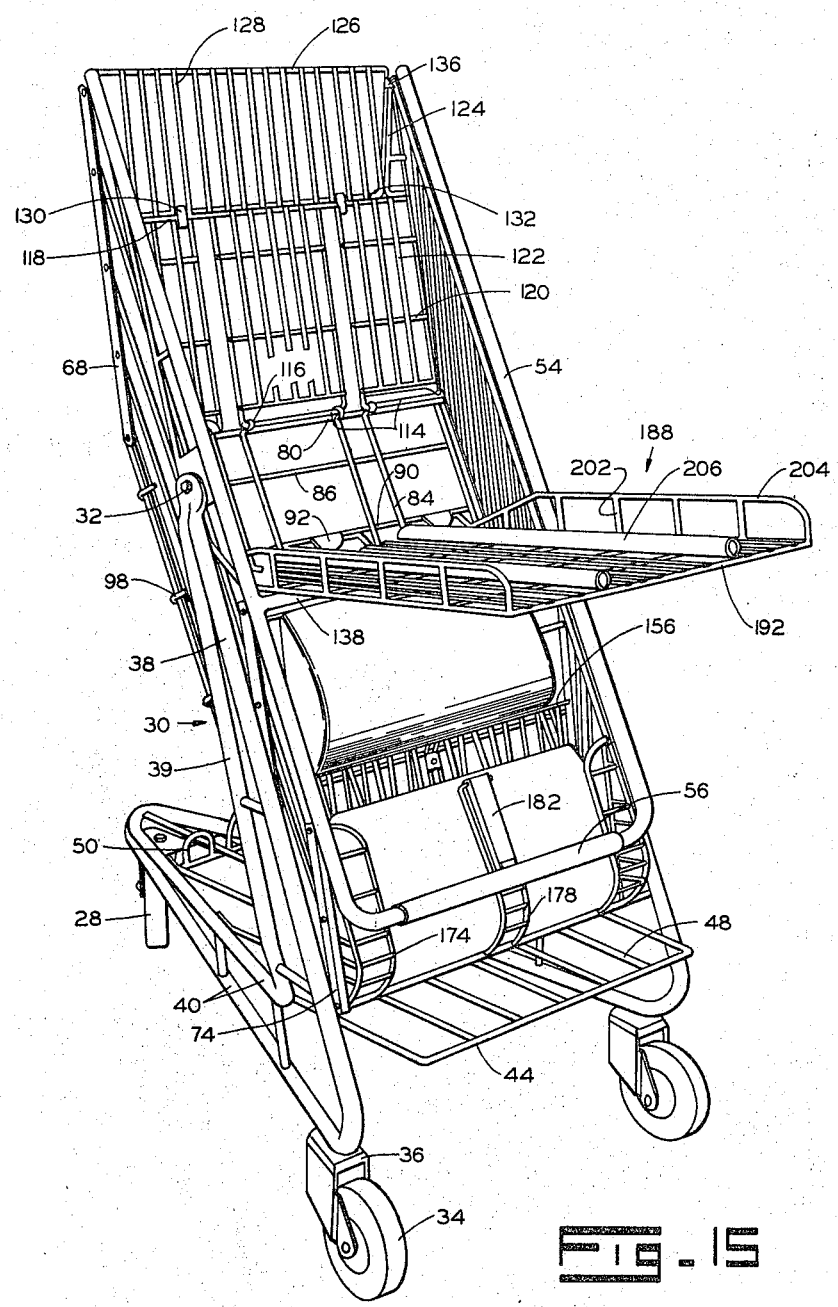
FIGURE 15 is a rear quarter perspective view of the cart of the invention with the container basket in collapsed position and with the removable bottom member for the main basket positioned alternatively in a rearwardly projecting position to permit use of the cart for carrying bulk loads and for restocking shelves.
Figure 16:
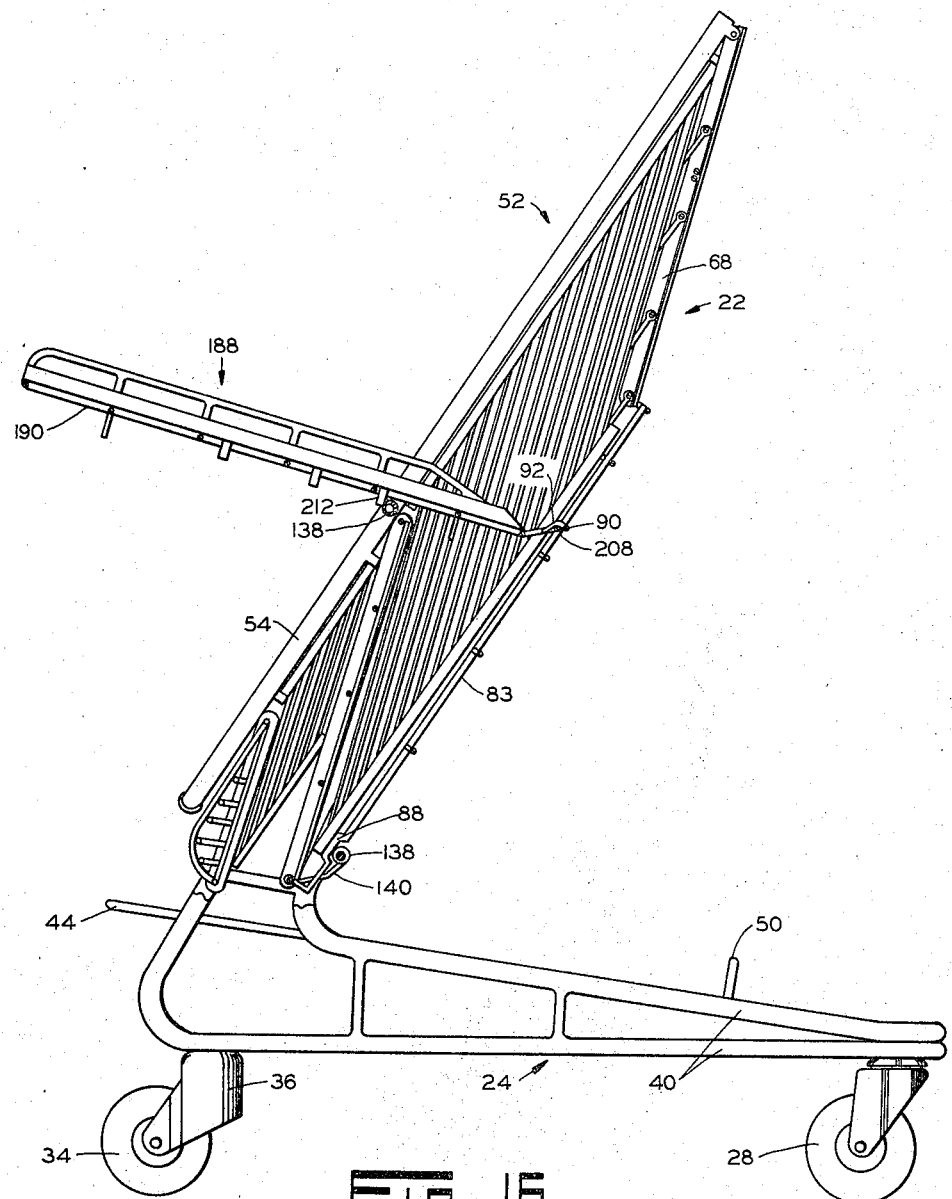
FIGURE 16 is a fragmentary side view, partially in cross section, of the cart with the container basket collapsed and the inner basket bottom arranged in alternate bulk load carrying position as appears in FIGURE 15, the container basket and removable bottom members being shown in vertical longitudinal cross section.

The removable inner bottom indicated generally at 188 which fits within the bottom of the main front container basket is shown most clearly in FIGURES 6, 7 and 8 and its alternative use as a bulk package support is shown in FIGURES 15 and 16. FIGURE 9 shows the auxiliary bottom in place in the bottom of the main container. The auxiliary bottom consists of a rectangular border wire frame 190 having front cross piece 192 and rear crosspiece 194. The crosspieces or wires are connected by side rods or wires 196 and intermediate cross wires 198 connect the side wires. A plurality of longitudinal wires 200 complete the bottom of the removable bottom member. At its side, upstanding struts 202 support raised side rails 204 for retaining small loose objects on the removable bottom member. Longitudinally extending reinforcing tubes 206 adapt the removable bottom for supporting heavy loads such as cases of canned goods.

Extending along the rear cross wire 194 is an angled rod or wire having laterally spaced rearwardly and upwardly projecting yoke-like hooks 208. Projecting downwardly from some of the cross wires 198 are semicircular disc like projections 210. Other short downwardly projecting rods 212 are secured to the bottom sides of the tube 206 for a purpose which will be described presently.

When the removable inner bottom 188 is positioned within the erected forward main container 22 as appears in FIGURE 9 the downwardly projecting discs 210 and pins 212 serve to engage between the cross wires or bars 86 and 90 of the rectangular bottom member 78 of the front basket. It will be noted that the removable bottom 188 collapses upwardly with the fixed bottom of the basket 22 when the basket is tilted to the inclined position shown in FIGURE 17.

The alternative use of the removable inner bottom 188 is shown in FIGURES 15 and 16. The inner bottom may be removed from the front container and when the front or main container basket 22 and the main top carriage or container frame 52 is tilted upwardly the removed bottom can be passed between the side members 54 of the container frame with the upturned yokes 208 of the removable bottom positioned adjacent to one of the permanent cross wires 90 of the front container bottom. The previously mentioned semicircular discs 92 are inclined rearwardly and downwardly and hook over the yokes 208. The border wire frame 190 of the removable bottom rests upon the fixed cross bar 138 of the carriage frame and one of the downturned or downwardly extending pins 212 is engaged with the rear side of the cross bar so that the removable bottom is supported as a rearwardly projecting shelf and is retained against longitudinal displacement between the cross bar 90 and the cross bar 138. The angle at which the removable bottom is disposed relative to the collapsed carriage may be varied by changing the inclination of the collapsed forward container 22 and engaging a different downwardly projecting set of pins 212 with the cross bar 138. In this adjusted position of the carriage, the cart has a substantial area for supporting bulk cases of goods so that the cart may be used by employees of a store for stocking shelves. Note that both the removable bottom 188 and the permanent lower shelf 44 of the carriage are available as supporting surfaces for bulk cases of goods. The cart may be pushed or pulled by pushing on the upwardly projecting end of the collapsed container or by pushing or pulling the rearwardly projecting end of the removable bottom.

Figure 17:
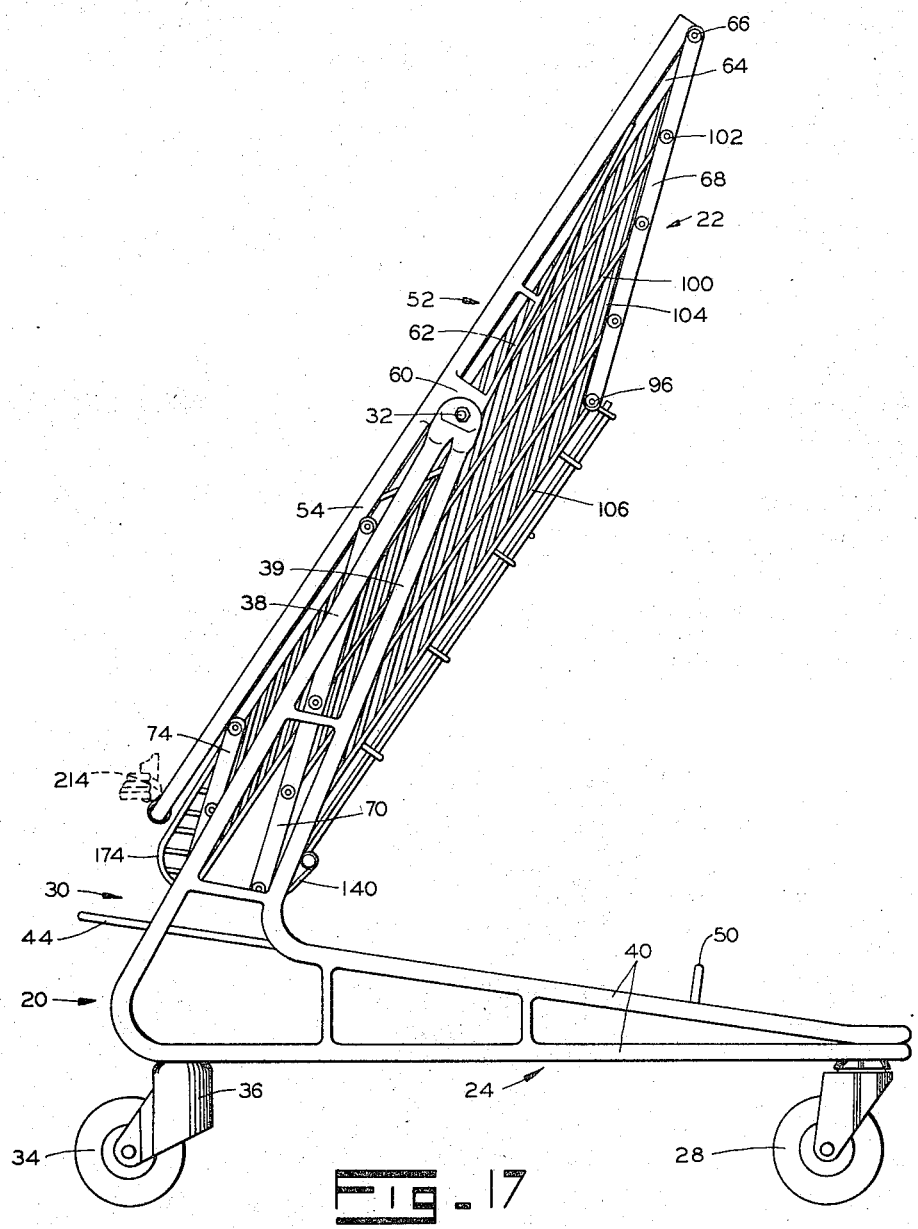
FIGURE 17 is a side elevational view of the cart with the container basket in collapsed position for storage of the cart.

When the cart is collapsed with the removable inner bottom therein as shown in FIGURE 17, the collapsed containers and the inclined position of the container support frame 52 occupy a minimum of space which is less than the space required for horizontally nesting the forwardly tapering lower base 24 of the cart. It is pointed out that the inclined position of the side members 54 of the container support frame present smooth inclined surfaces which are positioned to coact with the bumpers 214 connected to the lower front cross member 80 of the front container. It is thus practical to merely push a cart with its container in lowered rectangular position against the inclined frame 52 of a preceding cart which action will cam the front of the front container upwardly and force the spaced bottom bars 83 rearwardly. This in turn swings the rear hanger members 70 and the locking links 140 rearwardly to automatically raise and collapse the container. The interlock between the yoke-like strut 166 and stop projection 170 on the rear container bottom can be designed as shown in FIGURES 12 and 13 to simultaneously cam up the bottom frame 168 so that the auxiliary container collapses along with the forward main container when the auxiliary container is empty. However, the forward edge of the projection 170 is sufficiently steep that the bight 172 can not force the projections 170 upwardly when the auxiliary basket bottom is weighted, as by a child supported thereon, the presence of a child in the auxiliary basket thus positively preventing parallelogramming of the cart baskets. The modified form of projection 170A shown on the auxiliary container bottom in FIGURE 14 is designed to present a perpendicular surface in the notch 171 to the yoke 172 which will prevent this automatic release of the second lock. Where it is desirable to prevent automatic collapse and tilting of the containers of the cart, the modified structure in FIGURE 14 may be employed. In this instance it is necessary for the operator to raise both the seat cushion 84 and the bottom frame 162 of the auxiliary basket or container before the cart can be collapsed as the interlock between the strut 166 and the projection 170A will prevent rearward swinging of the rear corner bears 70. This in turn will prevent rearward and downward movement of the rear corner members 70 which permits upward collapse of the main container basket 22.

The upward offset 88 in the bottom corner side member 83 of the bottom of the main container engages over the fixed cross bar 138 of the carriage as shown in FIGURE 16 to prevent downward movement of the bottom of the main container under loads applied to the forward end of the removable bottom 188 when the car is used for transporting bulk loads. This prevents accidental collapse of the container portions of the cart and consequent damage to goods being transported thereon.

It will be noted that the front wall of the main basket includes a spaced pair of vertical slots 220 which extend upwardly to the gate defined by rod 126 and that said slots 220 are aligned with the reinforcing conduits 206 of the removable inner bottom member 188. Thus, the present shopping cart is adapted for use with suitable mechanical unloading means of any convenient type having a pair of vertically movable, horizontal lift rods insertable through the slots 220 into the conduits 206 for raising the bottom member 188 so that goods can be swept horizontally from the basket through the gate.

Although a particular preferred embodiment of the invention has been disclosed above for illustrative purposes, it will be understood that variations or modifications thereof which lie within the scope of the appended claims are fully contemplated.

What is claimed is new is:

1. A wheeled cart having a collapsible basket and a horizontally nestable carriage frame comprising, laterally spaced uprights for said frame with forwardly extending and laterally converging frame sides connected at their forward ends, wheels mounted at the rear of said frame sides and at the forward ends thereof, a rigid polygonal basket top frame having side members and a rear cross member with an intermediate cross member, first pivots swingably connecting intermediate portions of said basket frame side members to the tops of said carriage frame uprights, front and rear corner bars for said basket pivotally connected to said side members of said basket top frame at the front ends thereof and at points spaced rearwardly of said first pivots, a polygonal basket bottom having front and rear cross bars pivotally connected at their ends to the lower ends of said corner bars and connected to each other by longitudinally extending and laterally spaced bottom bars, transversely extending bottom bars connecting said longitudinal bottom bars of said basket bottom, laterally projecting stop members carried by said uprights of said carriage frame and coacting with said basket for limiting forward swinging of said basket, longitudinally spaced upright sidewall forming rods having their ends pivotally connected to said side members of said basket top frame and to said longitudinal bottom bars of said basket bottom, front and rear end wall means for said basket, and vertically spaced and longitudinally extending sidewall forming bars having their ends pivotally connected to said corner bars, whereby said basket is swingable vertically about said first pivots with said sidewall forming bars collapsing in folding parallelogram fashion.

2. A cart and basket as defined in claim 1 in which said laterally projecting stop members are carried by said uprights of said carriage frame below the horizontal position of said basket bottom, link means pivotally connected between said stop members and a transversely extending bottom bar of said basket bottom, and coacting stop projections on said link means and said basket bottom to a generally horizontal position of the basket bottom.

3. A cart and basket as defined in claim 2 in which said laterally projecting stop members are formed by a continuous transverse bar connecting said uprights of said carriage frame, and said link means comprise plural links spaced transversely of said transverse bar, the transverse bottom bar of the basket being the rear cross bar thereof and having a downwardly offset center portion connected by upturned ends to its pivoted connections to said rear corner bars, and front and rear wall forming bars for said basket supported between said corner bars.

4. A cart and basket as defined in claim 1 in which said front cross bar of said basket bottom has a downwardly offset center portion with upturned ends pivotally connected to the lower ends of said front corner bars, said front wall for said basket comprising, a lower rectangular section, means forming a horizontal pivotal connection between the lower edge of said lower section and said front cross bar, a top member on said lower section engageable with a longitudinally inner surface of said front corner bars to prevent outward swinging of said lower section, fixed downwardly converging elements secured to the transversely inner sides of said front corner bars above said top member of said lower section, a top front wall section of trapezoidal outline fitting between said converging elements, loop members forming loose swingable connections between the bottom of said top wall section and the top of said bottom wall section, and coacting stop means engageable between the tapered edges of said top wall section and said converging elements in the lowered position of said top wall section, said stop means being disengageable by upward movement of said top wall section in said loop member.

5. A cart and basket as defined in claim 3 in which said front cross bar of said basket bottom also has a downwardly offset center portion with upturned ends pivotally connected to the bottom ends of said front corner bars, longitudinal and transverse bars forming said basket bottom and supported from said front and rear cross bars thereof, and a removable inner bottom member freely supported upon said basket bottom between said side wall forming rods and said front and rear wall forming bars.

6. A cart and basket as defined in claim 5 in which there are coacting longitudinaly interlocking and vertically extending portions on said basket bottom and said inner bottom member.

7. A cart and basket as defined in claim 6 in which downwardly projecting ears on the bottom of said inner bottom member are engageable with a transverse bar of said basket bottom, and transversely spaced fingers on the rear edge of said inner bottom member engageable under a transverse bar of said basket bottom when said inner bottom member is removed and said basket top frame is tilted upwardly on said carriage frame, whereby said inner bottom member will project rearwardly in supported engagement with said transverse bar of said carriage frame.

8. A cart and basket as defined in claim 7 in which said inner bottom member has raised side rails, and longitudinal reinforcing bars thicker than the remainder of said inner bottom member.

9. A cart and basket as defined in claim 2 in which said side members of said basket top frame extend substantially rearwardly beyond said intermediate cross member to said rear cross member, an auxiliary rear basket having back corner bars pivotally suspended adjacent the rear cross member, longitudinally extending bottom side bars having their ends pivotally connected to the lower ends of said back corner bars and intermediate portions of said rear corner bars of the forward basket, short side wall rods having their ends pivotally connected to said bottom side bars, said rear wall means extending between said rear corner bars with the upper portion of the wall means common to the front and rear baskets, rear basket bottom support members pivotally connected between the bottoms of said back corner bars, transversely spaced rear wall sections pivotally connected between the rear of said rear basket bottom support members and the tops of said back corner bars, a central rear wall section pivoted at its lower end to the rear of said rear basket bottom support members and having its upper end pivotally connected to a strut projecting forwardly from the rear cross member of said basket top frame, and a rear basket bottom having its rear edge pivoted between said back corner bars and swingable between said short side wall rods into supported engagement with said rear basket bottom support members.

10. A cart and basket as defined in claim 9 in which said rear wall sections of said auxiliary basket are bowed vertically rearwardly, a cushion pivoted at its rear edge between the lower ends of said back corner bars and swingable into the bowed portion of said rear wall sections.

11. A cart and basket as defined in claim 9 in which said wall means between said front and rear baskets has a locking strut vertically swingably connected thereto below said rear basket and having a slidably supported connection to said rear basket bottom support means, and catch means on said rear basket bottom horizontally engageable with said strut when said rear basket bottom is in lowered supported engagement on the basket bottom support means.

12. A cart and basket as defined in claim 1 in which carriage frame comprises tubular bars diverging downwardly and inclined rearwardly in said uprights and converging vertically forwardly in said frame sides, there being a single caster mounted wheel at the transversely converging front end of said frame, and spaced wheels on the rear of said frame sides.

13. A cart with a nestable carriage and a collapsible container comprising, a forwardly converging tapered carriage frame having laterally spaced uprights inclined forwardly from its rear end, transversely aligned first pivots at the tops of said uprights, container supporting side members vertically swingably supported intermediate of their end on said first pivots, front corner members pivotally supported about transversely aligned axes from the front end of said side members, intermediate corner members pivotally supported from said side members and about transversely aligned axes located rearwardly of said first pivots and between the planes of said uprights, rear corner members pivotally supported from said side members and about transversely aligned axes spaced rearwardly from said intermediate corner members, first lower edge bars pivotally connected about transversely aligned pivots between said front and intermediate corner members to define a front container frame with said front and intermediate corner member, second lower edge bars pivotally connected at their rear ends about transversely aligned pivots to the lower ends of said rear corner members and to intermediate portions of said intermediate corner members to define a rear container frame with said rear and intermediate corner members, side wall forming rods having their ends pivotally connected between opposed sides of said container frames and collapsible therewith in parallelogram fashion, end wall means for said container, and lock means connectable with said container frames to prevent collapse of the frames.

14. A cart as defined in claim 13 in which said first lower edge bars have intermediate links pivotally connected to their forward ends, the other ends of the links being pivotally connected to said front corner members.

15. A cart as defined in claim 13 in which said lock means comprises a fixed projection extending transversely inwardly from said uprights below said front container frame, at least one locking link having its ends pivoted between said fixed projection and said front container frame, and coacting stops on said fixed projection and said locking link swingable into one way blocking engagement in the extended position of said front container frame.

16. A cart as defined in claim 15 in which the axes of the pivoted ends of said intermediate links are located forwardly of a plane through the pivot axes of said intermediate corner members and the connection of said locking link to said fixed projections.

17. A cart as defined in claim 13 in which said locking means comprises a strut pivotally supported by said intermediate corner members about a transverse axis located below the pivotal connection of said second lower edge bars to said intermediate corner members, means swingable with said second lower edge bars and defining a longitudinal guide slot in the general plane of the bottom of said rear container frame, said strut having an end slidably supported in said guide slot, a bottom panel swingably supported along one edge of said rear container frame, and a lug on said bottom panel swingable into blocking engagement with said end of said strut in the erected position of said container frames.

18. A cart as defined in claim 17 in which said lock means additionally comprises a fixed projection extending transversely inwardly from said uprights below said front container frame, at least one locking link having its end pivoted between said fixed projection and said front container frame, and coacting stops on said fixed projection and said locking link swingable into one way blocking engagement in the extended position of said front container frame.

19. A cart with a horizontally nestable carriage and a collapsible container comprising laterally spaced uprights on said carriage, a container top frame pivoted intermediate of its ends to the tops of said uprights, a container having a bottom connected to said top frame by end wall and further connected by side members comprising the side walls of said container, said members being pivoted to the sides of the bottom and the sides of the top frame to collapse upwardly and rearwardly in parallelogram fashion, and laterally projecting means on said uprights engageable with the bottom of the collapsed container to limit movement of said top frame to a downwardly and rearwardly inclined position.

20. A cart as defined in claim 19 in which said container has bumpers on its lower front edge engageable with the inclined frame of a preceding collapsed container.

21. A collapsible basket mounted on a cart having spaced uprights comprising, a polygonal top frame for said basket having spaced side members pivotally connected intermediate of their length to said uprights, front corner members pivotally connected to the front of said side members and depending therebelow, rear corner members pivotally connected to said side members at points spaced rearwardly of the pivotal connections of the side members to the uprights and depending therebelow, first basket bottom members pivotally connected to the lower ends of said corner members, first side wall forming members having their ends pivotally connected between the side members of said top frame and the sides of said first basket bottom members and collapsible therewith in parallelogram fashion, other auxiliary corner members pivotally connected to said top frame side members and depending therebelow from points spaced rearwardly of said rear corner members, second basket bottom members having their ends pivotally connected between the lower ends of said auxiliary corner members and points on said rear corner members intermediate of the length of the latter, second side wall forming members having their ends pivotally connected between said side members of said top frame and the sides of said second basket bottom members and collapsible therewith in parallelogram fashion, end wall means for said basket, and interlock means releasably engageable with one of said basket bottom members in restraining relation to collapsing motion of said side wall forming members.

22. A basket and cart as defined in claim 21 in which said interlock means comprises stop means extending transversely of said uprights at a point spaced rearwardly of the pivotal connection of said basket top frame to said uprights and below said first basket bottom member, link means having opposite ends pivotally connected to said first basket bottom members and said stop means, and swingable with the basket bottom about the stop means, and motion limiting projections on said link means and the part to which one end of the link means is pivoted, said projections being eccentric to the pivotal connections of the link means and limiting swinging motion of the link means to a position corresponding to the approximately rectangularly extended positions of said side wall forming members.

23. A basket and cart as defined in claim 23 in which said motion limiting projections are carried by said link means and said stop means carried by said uprights.

24. A basket and cart as defined in claim 21 in which said interlock means comprises a strut having one end pivotally connected relatively to said rear corner members along an axis offset vertically from the connection of said second basket bottom members thereto, the other end of said strut being slidably supported on said second basket bottom members, and a stop swingably supported on said second basket bottom members and swingable into blocking relation to the sliding end of said strut.

25. A basket and cart as defined in claim 24 in which said strut is pivoted to said rear corner members below the connection of said second basket bottom members thereto, and an inner bottom for said auxiliary basket having its rear edge pivotally connected between said auxiliary corner members, said stop being carried by said inner bottom and being swingable therewith into blocking relation to the sliding end of said strut.

26. A basket and cart as defined in claim 25 in which said stop has a notch formed therein presenting edges opposing horizontally rearwardly and vertically upwardly motion of the swinging end of said strut.

27. A basket and cart as defined in claim 24 in which said interlock means additionally comprises stop means extending transversely of said uprights at a point spaced rearwardly of the pivotal connection of said basket top frame to said uprights and below said first basket bottom member, link means having opposite ends pivotally connected to said first basket bottom members and said stop means and swingable with the basket bottom about the stop means, and motion limiting projections on said link means and the part to which one end of the link means is pivoted, said projections being eccentric to the pivotal connections of the link means and limiting swinging motion of the link means to a position corresponding to the approximately rectangularly extended positions of said side wall forming members.

28. A wheeled cart comprising:
a nestable frame and a plurality of wheels supporting same;
a basket supported by said frame above said wheels, said basket having end walls and further having side walls; comprised of members articulated to permit parallelogrammed collapsing of said side walls of said basket, the collapsed basket occupying a zone primarily between said wheels;
whereby frames of successive ones of such wheeled carts are adapted for nesting while the collapsed baskets thereof pack one against the next.

References Cited

UNITED STATES PATENTS

| | | |
|---|---|---|
| 2,155,896 | 4/1939 | Goldman. |
| 2,414,943 | 1/1947 | Gray. |
| 2,613,951 | 10/1952 | Rusnak. |
| 2,831,599 | 4/1958 | Graffeo. |
| 2,943,707 | 7/1950 | Ramlose. |
| 2,962,292 | 11/1960 | Edmonston. |
| 3,233,912 | 2/1966 | Chusid et al. |

FOREIGN PATENTS

| | | |
|---|---|---|
| 1,163,199 | 4/1958 | France. |
| 661,981 | 11/1951 | Great Britain. |

RICHARD J. JOHNSON, *Primary Examiner.*

MILTON L. SMITH, *Examiner.*